Figure 3:
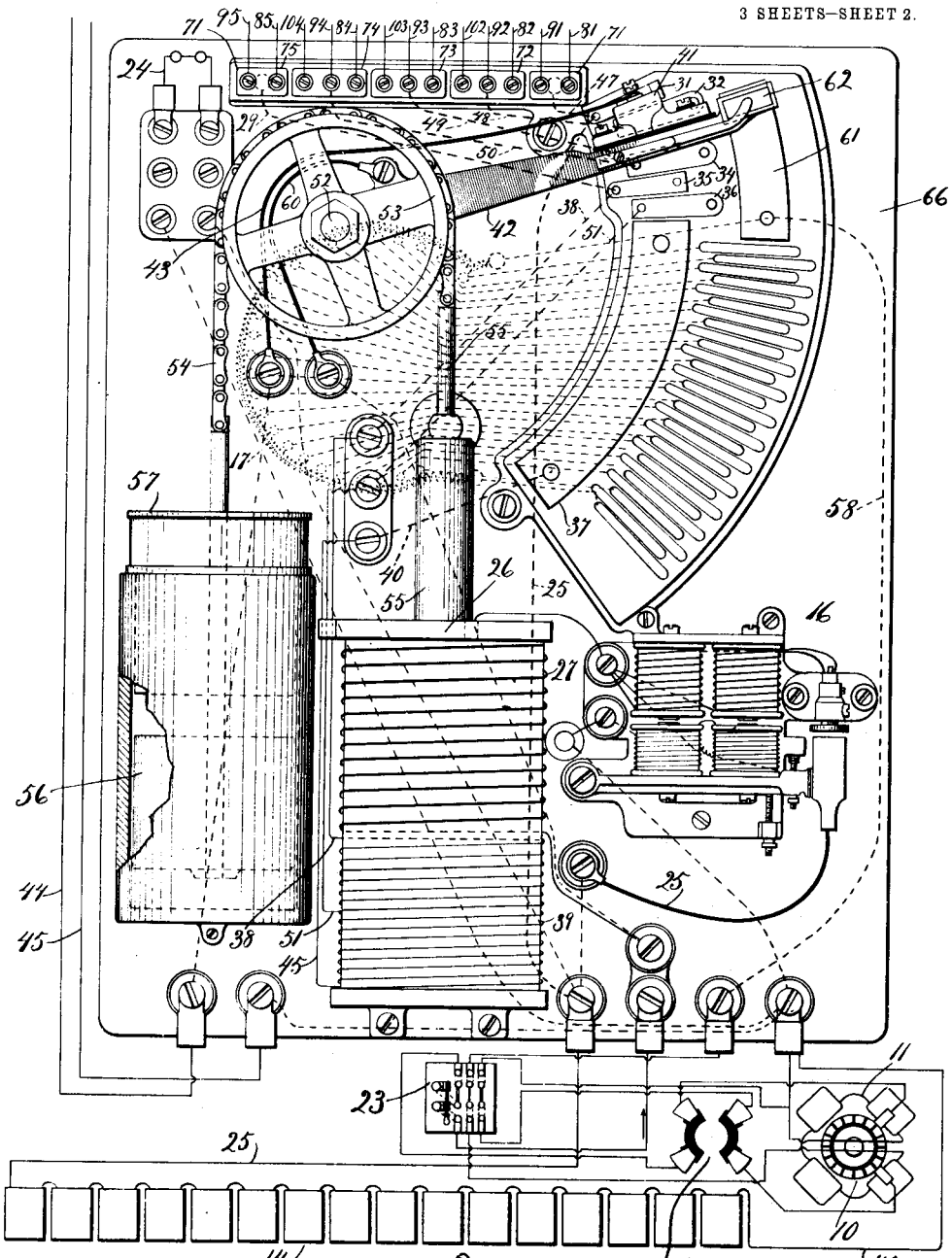

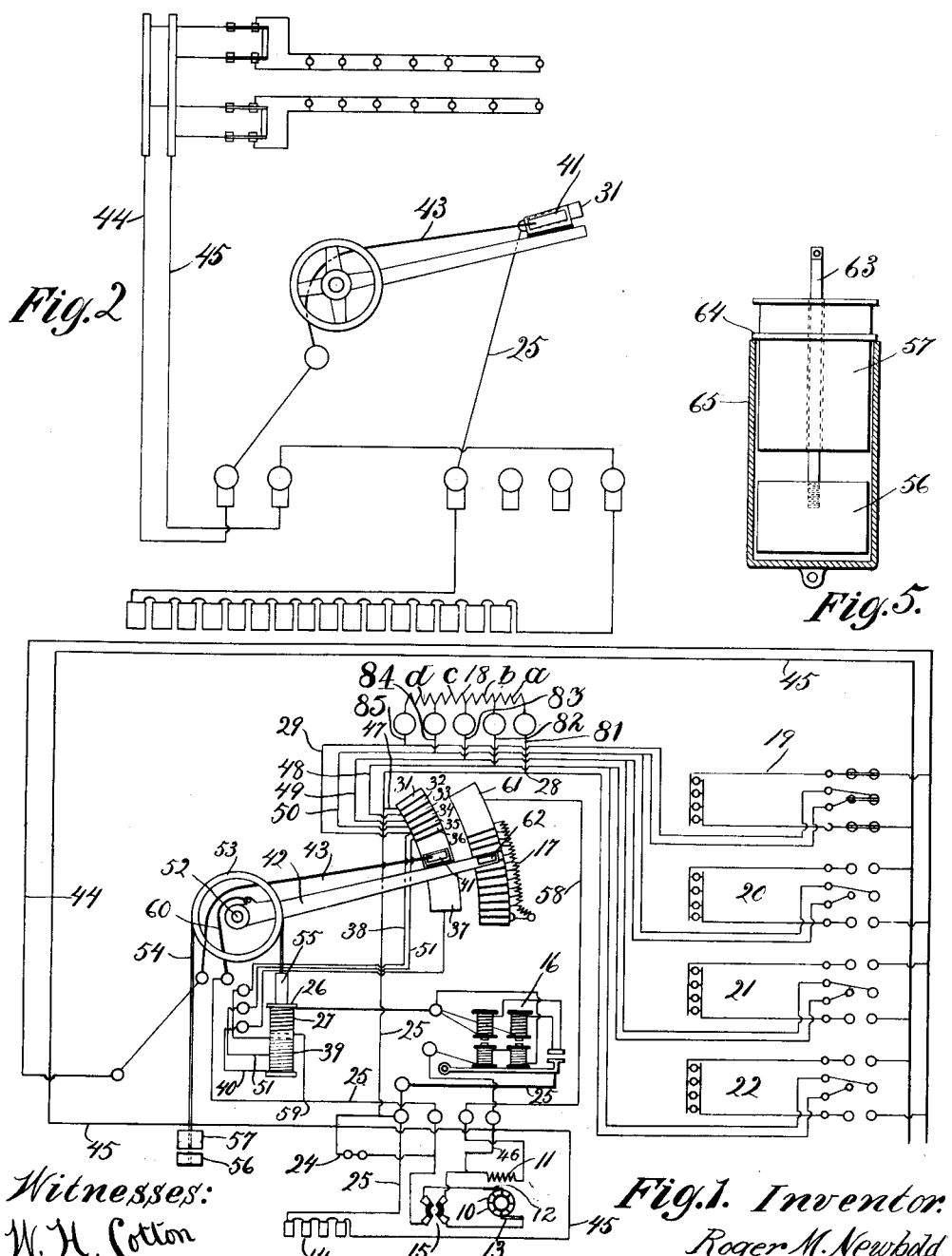

R. M. NEWBOLD.
REGULATOR FOR DYNAMO MACHINES AND ELECTRIC CIRCUITS.
APPLICATION FILED JULY 2, 1906.

1,034,924.

Patented Aug. 6, 1912.

Witnesses.
W. H. Cotton
Charles B. Gillson

Inventor.
Roger M. Newbold.
By
Atty.

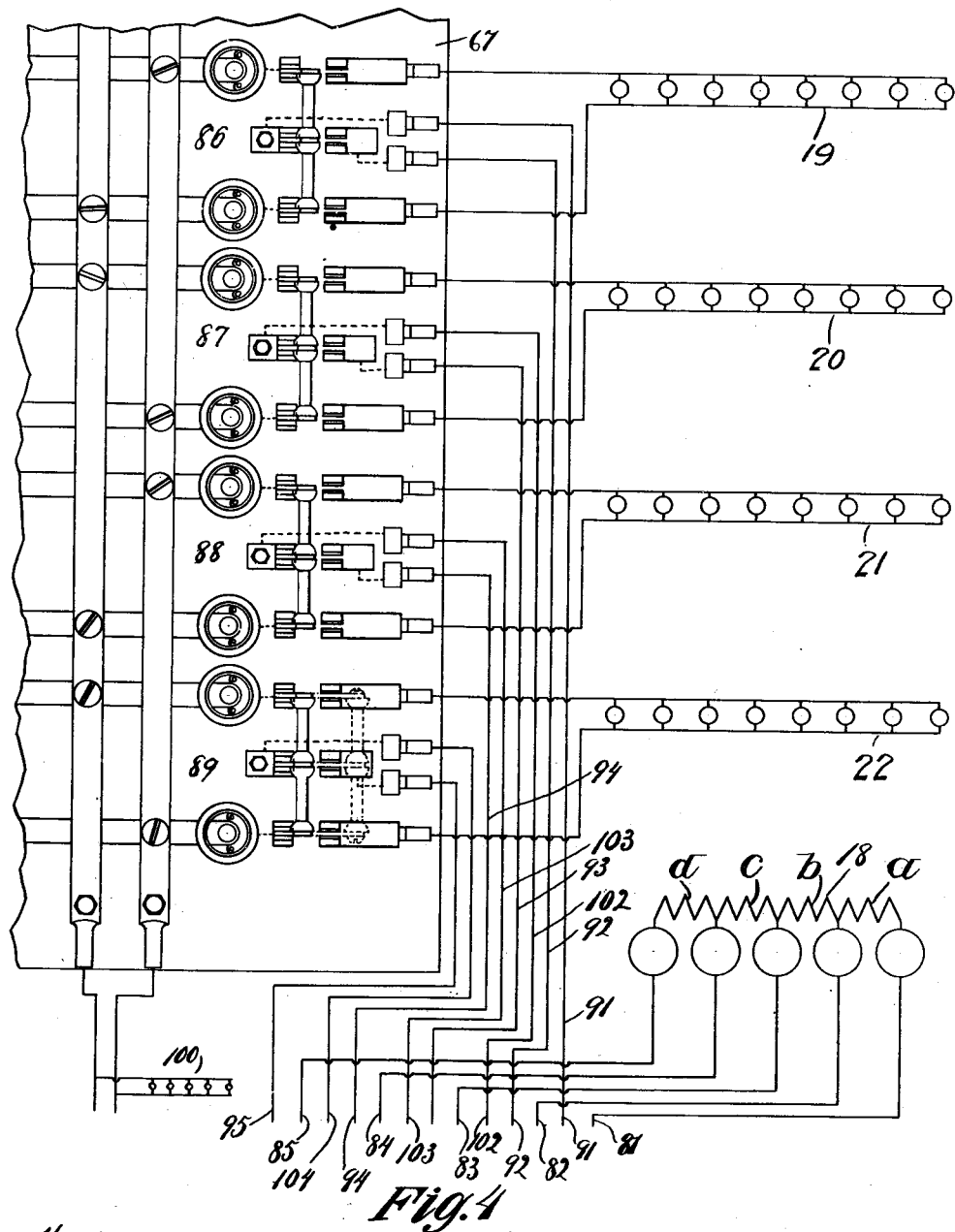

UNITED STATES PATENT OFFICE.

ROGER M. NEWBOLD, OF CHICAGO, ILLINOIS, ASSIGNOR TO THE ADAMS & WESTLAKE COMPANY, A CORPORATION OF ILLINOIS.

REGULATOR FOR DYNAMO-MACHINES AND ELECTRIC CIRCUITS.

1,034,924.  Specification of Letters Patent.  Patented Aug. 6, 1912.

Application filed July 2, 1906. Serial No. 324,412.

*To all whom it may concern:*

Be it known that I, ROGER M. NEWBOLD, a citizen of the United States, and resident of Chicago, county of Cook, and State of Illinois, have invented certain new and useful Improvements in Regulators for Dynamo-Machines and Electric Circuits, of which the following is a specification, and which are illustrated in the accompanying drawings, forming a part thereof.

This invention relates to the regulation of dynamos and electric circuits supplied thereby, and serving storage batteries and translating devices.

The invention relates particularly to electric lighting systems in which the dynamo is intermittently and irregularly operated, and a storage battery is employed which is charged by the same dynamo and supplies current to the lamp circuit when the dynamo is out of service. Such systems are used in what is known as axle generation lighting systems for railway cars, wherein the dynamo is driven from the axle of the car and hence in either direction and at greatly varying speeds. The exigencies of the service may require the simultaneous charging of the storage battery and operation of the lamps from the dynamo, or the dynamo may be called upon to serve only the lamp circuit or even a part thereof.

The objects of the invention are to provide a simple and effective electric lighting system in which a variable speed dynamo will perform the double service of simultaneously charging a storage battery and supplying current to lamps adapted to be served by the storage battery when the dynamo is inactive and more especially to provide for such service when the lamps are arranged in a plurality of separately-controlled branch circuits. These objects are attained by the means hereinafter described, and which are illustrated in the accompanying drawings, in which—

Figure 1 is a diagrammatic view of the entire system; Fig. 2 is a diagrammatic view of the lamp circuit, as served by the storage battery alone; Figs. 3 and 4, taken together, represent a view of the device showing the actual arrangement of the circuits, various parts being conventionally shown and some parts being broken away to show internal construction; and Fig. 5 is a sectional view of a weight casing used in the device, the weights being shown in elevation.

The dynamo is represented at 10, its field at 11, and its brushes at 12 and 13. A storage battery is represented at 14; a pole changer at 15; an automatic switch mechanism at 16; field resistance at 17; lamp resistance at 18; and lamp circuits in parallel at 19, 20, 21 and 22. A fuse box is represented at 23, and a pilot light circuit at 24, such circuit being of the usual type and having sufficient resistance to prevent disturbance of the circuit of the main line.

The pole changer 15 is present in systems of this character for maintaining a uniform direction of current in the battery and field circuits. The automatic switch 16 is present for the purpose of opening and closing the dynamo circuit as the dynamo speed falls below or attains to a predetermined rate, thereby preventing the discharge of the battery through the dynamo when the electromotive force of the latter is below that of the former. These accessories, together with the fuse box and pilot light circuit, are incidentals which have no immediate bearing upon the present invention.

The positive branch of the dynamo circuit, represented in Fig. 1 as leading from the brush 12, is designated 25 and leads first through the coil of a solenoid 26, as represented at 27, thence through the switch 16 when closed to the battery 14 or directly to the light circuit, where it is distributed, such resistance as may be required being automatically cut in.

Referring to Fig. 1, it will be seen that the line 25 reaches a point in the circuit beyond which it may properly be characterized as the light circuit at 28. The group of lights 22 to which this line directly leads being cut out, the circuit is through the resistance 18 and the line 29 to the lamp resistance contact 35, and thence through the line 38 to a counterwinding 39 of the solenoid 26, and thence through the line 40 to the lamp resistance contact 37. A contact shoe 41, carried by the oscillating arm 42, and coöperating with the lamp resistance contacts referred to, transmits the current to the line 43, from which it is delivered to the line 44 leading directly to the several lamp circuits. As shown in Fig. 1 the lamp circuit of group 19 is the only one which is closed, and from this group current is led through the line 45 to the line 46, which connects with the dynamo brush 13.

If the arm 42 were in the position shown in Fig. 3, that is to say, its shoe 41 being in engagement with the lamp resistance contact 31, the current would be led from the line 25 through the short line 47, Fig. 1, directly to the line 43, and hence through no lamp resistance whatever. As the arm moves down successively over the lamp resistance contacts 32, 33, 34 and 35, section after section of the resistance 18 is cut in, current being led successively through the lines 48, 49, 50 and 29.

When the contact-shoe 41 is in engagement with the lamp resistance contact 36, the current reaches it through the line 38 and the line 51 tapped into the solenoid coil 39.

The arm 42 is pivoted at 52, and mounted with it is a sheave 53, over which is turned a cord or chain 54, to one end of which is attached the core 55 of the solenoid 26 and to the other end a pair of weights 56, 57, so arranged as to be effective successively, as hereinafter described. When the dynamo is at rest the arm is fully retracted by the influence of the weights, its contact shoe 41 engaging the terminal 31. As the dynamo is brought into action and generates current, the solenoid is energized and the arm 42 drawn down proportionately with the strength of the current and correspondingly cutting in the lamp resistance. The arm 42 also coöperates with the field rheostat 17 in the line 58, leading to the dynamo field 11, the field circuit being a shunt of the main line branching therefrom at 59 and entering the arm 42 through the line 60. The first contact 61 of the rheostat 17 interposes no resistance, and is of such length that the shoe 62, carried by the arm 42, is in engagement with it until after all of the lamp resistance has been cut in. As the current still further increases, the arm 42 continues to descend, thereby increasing the resistance in the field 11 and thus regulating the dynamo. As the demands of the light circuit are increased by increasing the number of lights brought into service, the current passing through the counterwinding 39 of the solenoid 26 is increased, thus correspondingly counteracting the effect of the current in the primary winding 27 and permitting the upward movement of the arm 42 with a corresponding decrease in the field resistance, thereby providing for the generation of a sufficient current to meet the increased lighting demands.

As shown in Fig. 5, the weight 57 is loose upon the stem 63, carried by the cord 54, and is provided with a shoulder 64, which is caught, as the weight descends, by the upper end of the casing 65 within which the weights are housed, the lower weight 56, which is fixed to the stem 63, being permitted to still further descend. The parts are so proportioned that the weight 56 picks up the weight 57 as the arm 42 reaches the end of the rheostat contact 61, and hence the further downward movement of the arm is stopped until the strength of the current is such that the pull of the solenoid overcomes both weights.

The purpose in tapping the line 51 into the counter-solenoid winding 39 is to divide the spark developed between the contact shoe 41 and the lamp resistance contact as the counterwinding is cut out of the light circuit, due to the upward movement of the arm.

When the car is at rest the light circuit is supplied directly from the storage battery 14, as diagrammed in Fig. 2, the current passing through the lead 25 to the contact 31, the shoe 41, the lines 43, 44 and 45. As this circuit does not include the solenoid, the shoe 41 remains in contact with the contact plate 31 and the lamp resistance is not brought into the circuit.

A storage battery is preferably employed which discharges at the voltage for which the lamps used are adapted. It requires, of course, a higher voltage for charging. As practised the storage battery employed charges at approximately forty-two volts, and the lamps are adapted to a voltage of approximately thirty-two, at which voltage the battery discharges. The regulator is usually so set as to provide ample current for serving the lamps and charging the battery. It follows that the voltage developed by the dynamo is higher than the requirements of the lamps, and hence it becomes necessary to introduce resistance into the light circuit.

The counterwinding 39 of the solenoid 27, while primarily for the purpose of changing the regulation of the dynamo to provide the increased current output necessary when the light circuit is closed, has the additional function of reducing the voltage in that circuit to the requirements of the lamps, its resistance being properly adjusted to this end. The resistance of such a coil increases with the volume of current passed through it, and I therefore adapt it to the requirements of the light circuit as a whole, the dynamo voltage being that at which the storage batteries are charged. That is to say, the batteries charging at forty-two volts, and the lamp ratings being thirty-two volts, the resistance of the coil reduces the voltage ten volts when the entire light circuit is closed. It becomes necessary, therefore, as the branches of the light circuit are successively opened, to supply artificial resistance corresponding with the reduction of the drop of voltage across the coil 39 due to the reduction in volume of current required, and this is accomplished by the means shown and described wherein artificial resistance is cut in and cut out by the same switches that cut out and cut in branches of the light circuit which are periodically used.

As illustrated in Figs. 3 and 4, the light circuit is divided into five branches. The artificial resistance 18 provided is equal to the resistance of the four major branches, and comprises four sections $a$, $b$, $c$, $d$, each supplying the place of one of the branch lamp circuits when the latter is open. This with the circuit which carries the lamps which are always in service when natural light is deficient, such as aisle and platform lamps, is sufficient to effect the desired reduction in voltage. The four major branch circuits are shown as open and hence all of the resistance at 18 is cut in. The closing of any one of the branch circuits will cut out or short circuit one section of the lamp resistance, all of it being cut out or short circuited by the closing of all of these circuits.

As shown in Fig. 3, in which the system is shown more in detail than in Fig. 1, the regulator comprising the solenoid 26, the rheostats of the light and field circuits and their coöperating parts, and the cut-out switch 16 are mounted on a plate 66 which may be secured in any convenient position. Upon the same plate there is mounted a series of terminal blocks 71, 72, 73, 74 and 75, which are electrically connected, respectively, with the lamp resistance contacts 31, 32, 33, 34 and 35 by the lines 47, 48, 49, 50 and 29, respectively. These blocks are connected, respectively, with the resistance 18 by lines 81, 82, 83, 84 and 85, the first and last of which lead to its extreme terminals, the others being tapped into it at points which mark its division into sections. Adjacent terminal blocks are connected by lines leading to the switch board 67 (Fig. 4); terminal blocks 71, 72, by the lines 91, 92; terminal blocks 72, 73, by the lines 102 and 93; terminal blocks 73 and 74 by the lines 103 and 94; terminal blocks 74, 75, by the lines 104 and 95.

There are shown five groups 19, 20, 21 and 22 and 100, of lamps arranged in parallel. The line 25 is connected with the terminal blocks 71 through the lamp resistance contact 31, and the current may be led to the lamp resistance 18 through the line 81 and thence to the line 43 through any of the other lamp resistance contacts, the number of sections of resistance in circuit being determined by the current output of the dynamo.

If one or more of the lamp groups 19 to 22 Fig. 4 is in service, the current will pass through some or all of the lines connecting the terminal blocks 71 to 75, more or less of the resistance being thus short circuited.

Referring to Fig. 4, it will be seen that the lines connecting the several terminal blocks are controlled by the switches 86, 87, 88 and 89, which also control the branch light circuits 19 to 22, and hence when these branch circuits are open the terminal block lines are also open. As represented these several circuits are open, and hence the resistance 18 forms the only path for the current. Should one of the switches, as 89, be closed, as indicated in dotted lines, section $d$ of the resistance 18 would thereby be short circuited, the current finding a path (after the arm 42 has descended to bring the shoe 41 into engagement with the contact plates 35 or lower, say into engagement with the contact plate 37) through the line 81, through three sections $a$, $b$, $c$ of the resistance, and thence through the line 84 to the terminal block 74, thence through the line 104, the middle leg of the switch 89 and the line 95 to the terminal block 75, thence through the lamp resistance contact 35, line 38, the counterwinding of the solenoid, and the line 40 to the contact plate 37. Should the arm 42 not have descended below the lamp resistance terminal 33, but two sections $a$, $b$, of the resistance would remain in circuit, the current finding a path through the line 83 and the terminal block 73 to the line 43, through the lamp resistance terminal 33 and the shoe 41.

Should a second group of lamps be brought into service, two sections of the resistance would be short circuited. Assuming that the second group to be brought into service is the one designated 20, the current will find a path through the line 81 to the resistance 18 and through the section $a$ thereof and the line 82 to the contact-block 72, and thence, assuming the arm 42 to be in one of the lower positions, through the line 102, switch 87 and line 93, to the terminal block 73, thence through the line 83 to the resistance 18, and after passing through section $c$ thereof, returning through the line 84 to the terminal block 74, thence through the lines 104 and 95 to the terminal block 75, and thence to the lamp circuit.

The several sections $a$, $b$, $c$, $d$, of the resistance 18 are complementary to the several branch circuits 19, 20, 21 and 22, and the lines of each of these pairs of circuits are controlled by a single switch, respectively, 86, 87, 88 and 89, each arranged to open and close in alternation the circuits with which it coöperates. It follows, therefore, that as each group of lamps is brought into service a section of the artificial resistance is cut out; and as each group is cut out a section of the resistance is cut in.

The automatic control of the artificial resistance becomes necessary to regulate the voltage as the dynamo starts. The dynamo lead 25 is closed by the action of the switch 16 as soon as the electro-motive force of the generated current exceeds that of the storage batteries. If some of the branch circuits are open, the corresponding sections of the resistance 18 being closed, it is important that such resistance be short-circuited until a speed shall have been attained at which the dynamo will supply adequate current, otherwise there will be a temporary dimming of the lights to such an extent as to amount to a serious defect in the system. As soon as the current output exceeds the requirements of the lamps, it flows to the batteries, thereby occasioning a rise of voltage. With this increase in volume the arm 42 travels down and its movement cuts in section after section of the resistance as the same is required to keep the excessive voltage from the lamps. Thus it will be seen that provision is made for cutting in resistance when the lamp circuits, or any of them, are open, as the current builds up through the medium of the solenoid 26, and for automatically cutting out this resistance section by section as the lamp circuits are closed.

There is provided no resistance short-circuiting line in connection with the branch lamp circuit 100, as it is always in service when artificial lighting is required, and is necessary to supply the remainder of the resistance required to effect the desired reduction of voltage.

I claim as my invention—

1. In combination, a dynamo adapted to be driven at varying speeds, a plurality of independently controlled light circuits connected with the dynamo, artificial resistance in the dynamo work circuit, manually-controlled means for inversely varying the amount of resistance and the number of light circuits in service, and automatic means for varying such resistance as the current generated varies.

2. In combination, a dynamo adapted to be driven at varying speeds, a plurality of independently controlled light circuits connected with the dynamo, artificial resistance in series with the dynamo work circuit and being arranged in sections, the resistance of each section corresponding with the internal resistance of one of the lamp circuits; means for short-circuiting each of the sections of the resistance separately and for simultaneously closing one of the light circuits; and means for automatically varying the number of sections of such artificial resistance in service, when not manually short circuited, as the current output of the dynamo varies with respect to the requirements of the light circuits.

3. In combination, a main electric circuit, a plurality of lamp circuits arranged in parallel in the main circuit, a divided resistance, automatic means for introducing successive portions of the resistance into the main circuit, and a switch controlling each portion of the resistance and one of the lamp circuits, whereby when current is supplied to the said lamp circuit a portion of the resistance is short circuited.

4. A system for the generation and distribution of electricity comprising, in combination, a variable speed dynamo, a work circuit, resistance substantially equal to the resistance of the work circuit, means controlled by the dynamo for cutting in the resistance, and a switch arranged to simultaneously close the work circuit and short-circuit the resistance.

5. A system for the generation and distribution of electricity comprising, in combination, a variable speed dynamo, a work circuit, resistance, means controlled by the dynamo for cutting in the resistance, and a switch arranged to simultaneously close the work circuit and short-circuit the resistance.

6. A system for the generation and distribution of electricity comprising, in combination, a variable speed dynamo, a plurality of work circuits, resistance arranged in sections, each section being substantially equal to the resistance of one of the work circuits, means controlled by the dynamo for cutting in the several sections of the resistance successively, and switches for controlling the several work circuits and each arranged to automatically short-circuit a section of the resistance when it closes the work circuit with which it coöperates.

7. A system for the generation and distribution of electricity comprising, in combination, a variable speed dynamo, a plurality of work circuits, resistance arranged in sections, means controlled by the dynamo for cutting in the several sections of the resistance successively, and switches for controlling the several work circuits and each arranged to automatically short circuit a section of the resistance when it closes the work circuit with which it coöperates.

8. A system for the generation and distribution of electricity comprising, in combination, a variable speed dynamo, a work circuit and a storage battery connected in multiple with the dynamo, resistance in the work circuit, means controlled by the dynamo for cutting in the resistance when the work circuit is open, and a switch for controlling the work circuit and arranged to short circuit the resistance when the work circuit is closed.

9. A system for the generation and distribution of electricity comprising, in combination, a dynamo, a storage battery, and a work circuit connected with the dynamo in multiple, the work circuit being subdivided into a plurality of branches, resistance in the work circuit and arranged in sections, means controlled by the dynamo for cutting in the several sections of the resistance successively, and switches for the several branches of the work circuit, and each arranged to short circuit a section of the resistance when it closes the branch with which it coöperates.

10. A system for the generation and distribution of electricity comprising, in combination, a shunt-wound variable speed dynamo, a regulator for the dynamo field comprising a solenoid in series with the main dynamo line, a work circuit in series with a coil of the solenoid opposing the coil thereof included in the main dynamo line, resistance in the work circuit, an arm actuated by the solenoid for cutting in the resistance, and a switch for controlling the work circuit and arranged to simultaneously short circuit the resistance when it closes the work circuit.

11. A system for the generation and distribution of electricity comprising, in combination, a shunt-wound variable speed dynamo, a regulator for the dynamo field comprising a solenoid in series with the main dynamo line, a work circuit in series with a coil of the solenoid wound thereon reversely as to the main dynamo line, such work circuit being subdivided into a plurality of branches, resistance in the work circuit and being arranged in sections, means controllable by the solenoid for cutting in the several sections of the resistance successively, and switches for the several branches of the work circuit each arranged to short circuit a section of the resistance when it closes the branch of the work circuit with which it coöperates.

ROGER M. NEWBOLD.

Witnesses:
    Louis K. Gillson,
    E. M. Klatcher.